Patented July 7, 1931

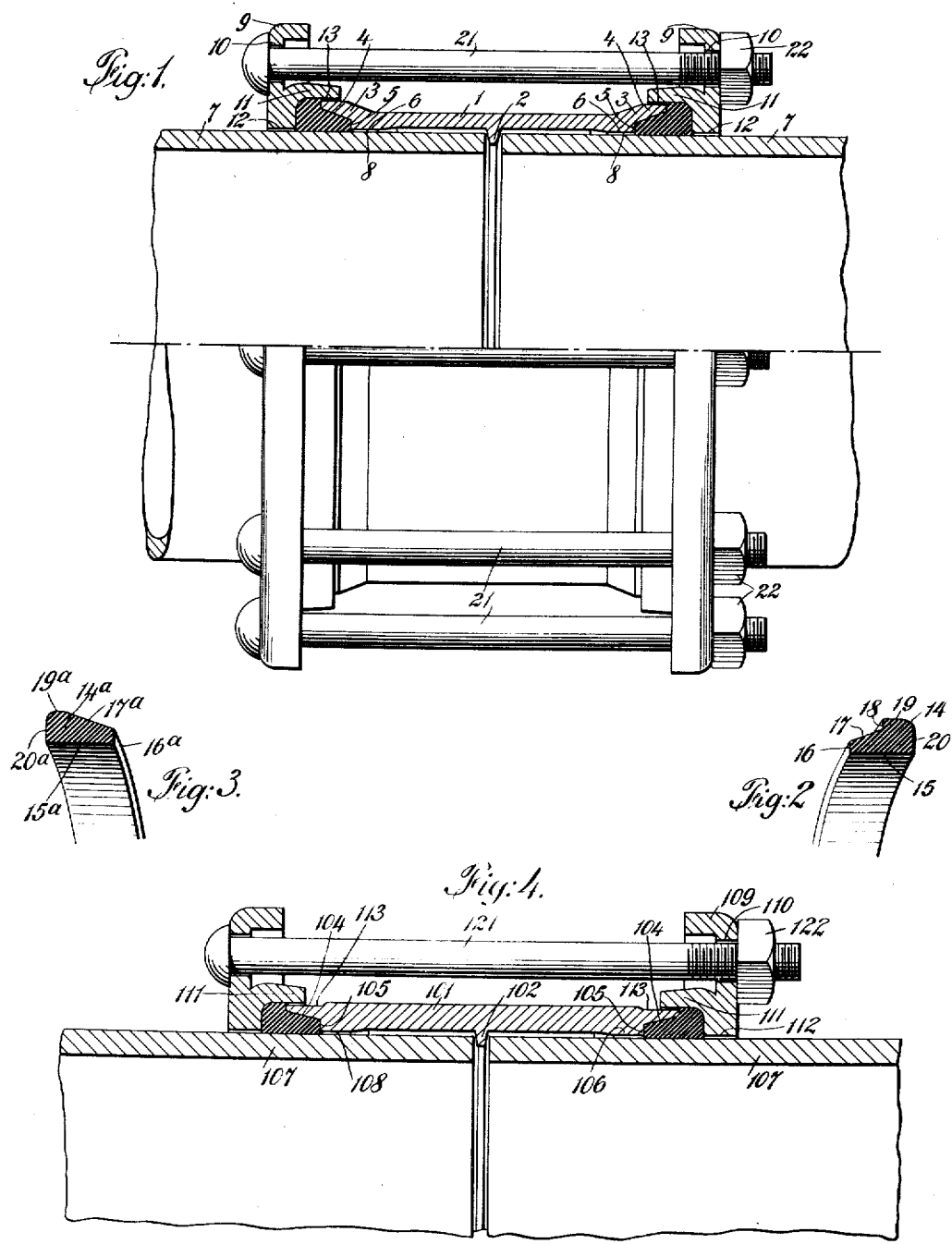
July 7, 1931. J. CLARK 1,813,529
PIPE COUPLING FOR PLAIN END PIPES
Filed Jan. 18, 1930

1,813,529

UNITED STATES PATENT OFFICE

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

PIPE COUPLING FOR PLAIN END PIPES

Application filed January 18, 1930. Serial No. 421,701.

My invention consists in the novel features hereinafter described, reference being had to the accompanying drawings which illustrate several embodiments of the same, selected by me for purposes of illustration, and the said invention is fully disclosed in the following description and claims.

My present invention is an improvement in rubber packed pipe couplings for connecting the adjacent edges of plain or unthreaded pipe sections, these couplings being of the type usually referred to as the "Dresser" type of couplings. These couplings comprise a middle ring provided at each end with a flaring or tapered packing recess, annular packing rings surrounding the pipe ends and having tapered or conical portions extending into the packing recesses, clamping rings or followers surrounding the pipe ends and provided with packing recesses for enclosing the portions of the packing rings exterior to the packing recesses, and comprising the packing rings, and clamping bolts for connecting the clamping rings.

In the use of couplings of this type, it has been found that the wedge-shaped or conical portions of the packing rings, which are usually formed with a very thin edge, have a tendency to squeeze into the space at the inner end of each packing recess in the middle ring between the middle ring and the enclosed pipe section. This has made it necessary to work to very close clearances between the exterior of the pipe and the interior of the middle ring adjacent to the packing recess, which increases the cost of manufacture of both the pipe and the middle rings. These couplings have been used most largely in pipe lines for the transmission of natural gas for considerable distances across the country, the gas being carried therethrough at considerable pressure, and the working pressures on these gaslines have been constantly increased. At the present time a gasline is contemplated in which the gas will be compressed to a pressure of 800 pounds per square inch. The increase of the pressures within the lines has made it necessary to more greatly compress the packing rings which are usually composed of rubber or rubber compound, and the greater compression of these packing rings has increased their tendency to flow between the pipe sections and the adjacent portions of the middle ring, thus continually reducing the clearances or tolerances, presumably between the pipe and middle ring, at the inner ends of the packing recess.

Furthermore, it has been found in certain instances that after a coupling has been installed and the packing rings compressed to a point sufficient to prevent leakage at the pressure to which the line is subjected, the flow of the tip portions of the packing rings between the pipe sections and the middle ring has resulted in a decrease in the compression of the main bodies of the packing rings themselves, so that they are no longer tight, and leaks have developed from this cause. It also follows that when the tipped portions of the packing rings flow into the space between the pipe sections and the middle ring, such portions of the middle ring are under very little compression and are therefore much more readily affected injuriously by liquids in or deposited in the pipe line than would be the case with portions of the packing under high compression, which are naturally less susceptible to penetration by such liquids.

It has also been found that where the truly wedge-shaped type of packing rings is employed, the compression of the packing rings may in some instances actually distend the middle ring, thus increasing its inside diameter, or compress the pipe end, thus decreasing its diameter, and in either case increasing the clearance between the parts beyond the desired tolerances and nullifying the expense and care which has been expended to produce these parts at the tolerances desired.

According to my invention these objectionable features are entirely obviated by forming, at the inner end of the packing recess, at each end of the middle ring, an annular abutting shoulder, perpendicular to the axis of the ring, and by providing the inner end of each packing ring with an annular abutting face perpendicular to the axis of the packing ring, to engage the abutting shoulder of the middle ring. This construction practically prevents any material portion of the packing ring from flowing into the space or clearance between the middle ring and the enclosed pipe ends, and permits a more satisfactory compression of the packing ring longitudinally of the axis of the coupling. As the packing ring is confined between the outer walls of the packing recesses in the middle ring and clamping ring, a longitudinal compression of the packing rings produces a lateral expansion thereof, which forces them tightly into contact with the exterior face of the pipe and insures the permanent tightness of the joint. At the same time as the portions of the packing rings at the inner ends of the packing recesses in the middle ring are under the same compression as all other portions of the packing ring, these inner end portions which are alone liable to contact with liquids in or deposited in the pipes, are protected by their highly compressed condition from being injuriously affected by such liquids, and the resort to protecting surfaces of lead and other materials for the inner ends of the packing rings is rendered unnecessary.

Referring to the accompanying drawings, which illustrate the preferred form in which I have contemplated embodying my invention, and several slight modifications thereof, Fig. 1 represents a pipe coupling of the kind referred to, a portion thereof being illustrated in section.

Fig. 2 is a perspective view partly in section, illustrating one form of packing ring which may be employed in this coupling.

Fig. 3 is a similar view showing a slight modified form of the packing ring.

Fig. 4 is a sectional view, broken away, showing a slightly modified form of my improved coupling intended for a heavier type of pipe section.

In Fig. 1, 1, represents the middle ring or sleeve of the coupling, preferably formed of wrought metal, which is provided with the usual centering stop, 2, and is provided adjacent to each end with an outwardly flared portion, 3, to provide the annular packing recesses. Each of these recesses has an outwardly flared wall, indicated at 4, terminating at its inner end in an annular shoulder, 5, substantially perpendicular to the axis of the middle ring. Adjacent to each of the shoulders or abutments, 5, the interior of the middle ring is provided with what I term the pipe engaging portion, to wit, a cylindrical portion, 6, which is adapted to fit around the plain end of a pipe section, with a predetermined clearance or tolerance, sufficient to accommodate the usual variations in the exterior surface of the pipe. The two pipe sections to be connected are indicated at 7—7 in Fig. 1. The annular clearance referred to, which is indicated at 8, 8, in Fig. 1, is very much less in radial width than the width of the adjacent shoulders or abutments, 5, 5.

The interior diameter of the middle ring, 1, between the pipe engaging portions, 6, 6 and centering stop, 2, are made of greater diameter than the pipe engaging portions, 6, 6, in order that the pipe sections may be placed with their axes at an angle to each other to facilitate carrying the pipe line around curves and over hills and valleys.

In connection with the middle ring, I provide a pair of clamping rings, indicated at 9, 9, each of which is provided with an annular body member provided with bolt holes, 10, and having an annular flange member, 11, of less diameter than the main body and projecting from one side of the same and surrounding the pipe opening in the clamping ring, which is indicated at 12. The inner wall of the flange member, 11, and the portion of the body member within said flange, forms a packing recess in the clamping ring, and the flange member 11, of each ring is of sufficient length in a direction parallel to the axis of the ring so that it will extend over the outer end portions of the middle ring, indicated at 13, and enclose the same with very little clearance between them. These outer end portions, 13, of the middle ring are preferably formed with substantially cylindrical exterior faces, as shown.

The coupling is provided with two packing rings formed, for example, as illustrated in detail in Fig. 2. Each of these packing rings, indicated as a whole at 14, is provided with an inner cylindrical face to engage the plain end of a pipe section, 7, an annular abutting face, 16, perpendicular to the axis of the ring, for engaging the abutment or shoulder, 5, at the inner end of the packing recess, an outwardly inclined face, 17, for engaging one of the flared faces, 4, of the middle ring, extending from the abutting face 16, to another annular face, 18, extending perpendicular to the axis of the ring, and engaging one of the end faces of the middle ring, the exterior faces of the packing ring, indicated at 19, 20, being formed to fit the packing recess in the clamping ring.

In assembling the parts of the coupling, the meeting ends of the pipe sections, 7, are inserted in opposite ends of the middle ring, which is centered over the joint by means of the centering stop, 2, in the usual manner, each of the pipes having been previously provided with a packing ring and clamping ring. The packing rings are then shoved along the pipe sections into the recesses in the middle ring, so as to bring the inner end faces, 16, into contact with the abutting faces, 5, of the middle ring, and the inclined faces, 17, of the packing rings into engagement with the inclined faces, 4, of the packing recesses in the middle ring. The clamping rings are then moved up so that each encloses one of the packing rings, bolts, 21, are passed through the apertures in the clamping rings, and provided with nuts, 22, which are screwed up so as to draw the clamping rings toward each other and compress the packing rings. As clearly shown in Fig. 1, the strain of the bolts will compress the packing rings longitudinally of their axes between the clamping rings and the abutting faces, 5, at the inner ends of the packing recesses in the middle ring, thus tending to expand the packing rings laterally, and forcing the inner faces, 15, of the packing rings into tight engagement with the pipe sections, as the packing rings are held from expansion outwardly by the annular flange members, 11, of the clamping rings and by the inclined faces, 4, 4, of the middle rings, which latter also tend to force the packing rings toward the pipe sections as they are longitudinally compressed. The abutting faces, 5, of the middle ring, receive the end thrust of the packing rings due to the bolt strain, and not only assist in the longitudinal compression of the packing rings, but prevent any material portion of the packing rings from being squeezed into the clearance, 8, 8, between the pipe sections and the pipe engaging portions of the middle ring. It follows, therefore, that when the packings have been compressed sufficiently to make a tight joint to withstand a definite internal pressure to which the pipe line is to be subjected, the joint will remain tight indefinitely and no material lowering of the compression of the packing rings can take place. It will also be clearly seen in Fig. 1, that the inner ends of the packing rings adjacent to the abutting faces, 16, a portion of which only are liable to contact with liquids within the pipe line, are under as great compression as any other portions of the packing rings. This compressed condition of the portions of the packing rings exposed to pipe liquids, prevents the penetration of said liquids into the packing rings to any material extent, and therefore prevents the injurious action of said liquids on the packing rings.

In Fig. 3 I have shown a slightly modified form of packing ring having the annular inner face, 15ª, the inner abutting face, 16ª, and outer beveled face, 17ª, the latter extending in this instance to the portoin, 19ª, at the outer end of the packing ring, without providing the annular face, 18, shown in Fig. 2. The packing can be made in this form and used in connection with the parts illustrated in Fig. 1, as the elasticity of the material will accommodate the packing to the configuration of the space formed by the packing recesses in the middle ring and adjacent clamping ring, the extreme end portion of the middle ring embedding itself in the inclined face, 17ª, of the packing ring, which is compressed into the condition indicated in Fig. 1.

In Figure 4, in which the parts corresponding with those shown in Fig. 1 are given the same reference numerals with the addition of 100, I have illustrated a partial section of a coupling very similar to that shown in Fig. 1, but intended for a heavier grade of pipe. In this instance the middle ring, 101, is shown with a much thicker wall and the packing recesses are formed in the ends with the abutting faces, 105, and outwardly inclined faces, 104, without actually deflecting any portion of the middle ring bodily outwardly, the end portions of the middle ring being provided with the cylindrical faces, 113, of slightly reduced diameter, to permit them to be used with clamping rings having their flanged portions, 111, kept as closely adjacent to the pipe walls as possible, to avoid increasing the diameter of the bolt circle, and thus keeping the bolts as closely as possible to the middle ring, while permitting the middle ring and clamping rings to be made of heavier material, proportionate to the heavier walls of the pipe sections, 107. Either form of packing ring shown in Figs. 2 and 3 may be employed with this coupling, but the form shown in Fig. 3 is particularly adapted for the coupling constructed as shown in Fig. 4.

Actual tests of the couplings illustrated in Figs. 1 and 4 have shown that when tightened up to resist pressures of 800 pounds per square inch, or greater, in the pipe sections which they connect, and permitted to stand for a considerable period, there is practically no creeping or flowing action of the packing rings between the pipe engaging portions of the middle ring at the inner ends of the packing recesses and the pipe sections. In extensive tests of these couplings no leakage has been found, and no loosening of the bolts and nuts is evident, which would be the case if the gaskets creep and reduce their compressed condition between the pipes, middle ring, and the clamping rings.

What I claim and desire to secure by Letters Patent is:—

1. In a pipe coupling for plain end pipes, the combination with a middle ring, provided at each end with a packing recess, having at its inner end an annular shoulder substantially perpendicular to the axis of the ring and an outwardly flaring wall extending from the outer edge of said shoulder toward the end of the ring, clamping rings having packing recesses, resilient packing gaskets each having a tapered portion for engaging the packing recess of the middle ring, terminating in an annular face substantially perpendicular to the axis of the gasket to have abutting engagement with said shoulder of the middle ring, and means for causing said clamping rings to compress said gaskets axially against said shoulders.

2. In a pipe coupling for plain end pipes, the combination with a middle ring provided at each end with a packing recess terminating at its inner end in an annular shoulder substantially perpendicular to the axis of the ring and an outwardly flaring wall extending from the outer edge of said shoulder to the outer end of the ring, said middle ring having substantially cylindrical pipe engaging portions adjacent each of said shoulders, said shoulders having a width much greater than the clearance between said pipe engaging portions and the pipe sections, resilient packing gaskets each having an annular tapered por- gaskets each having an annular tapered por- in the middle ring and provided with an annular face substantially perpendicular to the axis of the ring to have abutting engagement with one of said shoulders and having portions extending outside of said packing recess of a pair of clamping rings each provided with a packing recess into which the exterior portions of said gaskets extend, and clamping bolts and nuts for connecting said clamping rings to compress said gaskets axially against said shoulders.

In testimony whereof I affix my signature.

JAMES CLARK.

stantially perpendicular to the axis of the ring and an outwardly flaring wall extending from the outer edge of said shoulder to the outer end of the ring, said middle ring having substantially cylindrical pipe engaging portions adjacent each of said shoulders, said shoulders having a width much greater than the clearance between said pipe engaging portions and the pipe sections, resilient packing gaskets each having an annular tapered por- gaskets each having an annular tapered por- in the middle ring and provided with an annular face substantially perpendicular to the axis of the ring to have abutting engagement with one of said shoulders and having portions extending outside of said packing recess of a pair of clamping rings each provided with a packing recess into which the exterior portions of said gaskets extend, and clamping bolts and nuts for connecting said clamping rings to compress said gaskets axially against said shoulders.

In testimony whereof I affix my signature.

JAMES CLARK.

CERTIFICATE OF CORRECTION.

Patent No. 1,813,529.        July 7, 1931.

JAMES CLARK.

It is hereby certified that error appears in the printed specification of the above numbered patent requiring correction as follows: Page 4, line 11, claim 2, strike out the words "gaskets each having an annular tapered for-" and insert instead the syllable and words "tion for engaging one of said packing recesses"; and that the said Letters Patent should be read with this correction therein that the same may conform to the record of the case in the Patent Office.

Signed and sealed this 27th day of December, A. D. 1932.

(Seal)                                      M. J. Moore,
Acting Commissioner of Patents.

CERTIFICATE OF CORRECTION.

Patent No. 1,813,529.  July 7, 1931.

JAMES CLARK.

It is hereby certified that error appears in the printed specification of the above numbered patent requiring correction as follows: Page 4, line 11, claim 2, strike out the words "gaskets each having an annular tapered for-" and insert instead the syllable and words "tion for engaging one of said packing recesses"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.